(12) United States Patent
Chokshi et al.

(10) Patent No.: US 11,150,100 B2
(45) Date of Patent: Oct. 19, 2021

(54) SAFE ROUTING FOR NAVIGATION SYSTEMS

(71) Applicant: Uber Technologies, Inc., San Francisco, CA (US)

(72) Inventors: Karna Chokshi, San Francisco, CA (US); Meron Alon, San Francisco, CA (US); Sangick Jeon, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 64 days.

(21) Appl. No.: 16/783,653

(22) Filed: Feb. 6, 2020

(65) Prior Publication Data
US 2020/0173799 A1    Jun. 4, 2020

Related U.S. Application Data

(63) Continuation of application No. 16/272,915, filed on Feb. 11, 2019, now Pat. No. 10,563,994, which is a continuation of application No. 15/969,743, filed on May 2, 2018, now Pat. No. 10,209,085, which is a continuation of application No. 15/881,677, filed on Jan. 26, 2018, now Pat. No. 10,036,644, which is a continuation of application No. 15/378,043, filed on Dec. 14, 2016, now Pat. No. 9,927,252.

(51) Int. Cl.
*G01C 21/34* (2006.01)
(52) U.S. Cl.
CPC ............... *G01C 21/3461* (2013.01)
(58) Field of Classification Search
CPC ................................................ G01C 21/3461
See application file for complete search history.

(56) References Cited

U.S. PATENT DOCUMENTS

| | | | | |
|---|---|---|---|---|
| 8,290,705 | B2 * | 10/2012 | Trinko | G01C 21/367 701/454 |
| 8,805,707 | B2 * | 8/2014 | Schumann, Jr. | G08G 1/096775 705/4 |
| 9,574,888 | B1 * | 2/2017 | Hu | G01C 21/3461 |
| 9,919,648 | B1 * | 3/2018 | Pedersen | G08G 1/048 |
| 2004/0225544 | A1 * | 11/2004 | Camer | G06Q 10/06311 705/7.13 |
| 2006/0247852 | A1 * | 11/2006 | Kortge | G01C 22/00 701/533 |

(Continued)

FOREIGN PATENT DOCUMENTS

CN    204475907 U   *  7/2015

OTHER PUBLICATIONS

United States Office Action, U.S. Appl. No. 15/378,043, dated May 8, 2017, six pages.

*Primary Examiner* — Shelley Chen
(74) *Attorney, Agent, or Firm* — Fenwick & West LLP

(57) ABSTRACT

Examples provided herein describe a navigation system to identify routes that take safety considerations into account. The system accesses safety data from various sources and computes safety data for individual road segments of a map database at multiple times for each road segment. The road segment safety data is used when determining routes for requested trips, including estimating the times that the various road segments on the route will be traversed and determining the safety of each road segment at that time.

20 Claims, 6 Drawing Sheets

(56) References Cited

U.S. PATENT DOCUMENTS

| | | | |
|---|---|---|---|
| 2010/0332131 A1* | 12/2010 | Horvitz | G01C 21/3484 |
| | | | 701/414 |
| 2012/0123806 A1* | 5/2012 | Schumann, Jr. | G06Q 40/08 |
| | | | 705/4 |
| 2012/0136567 A1* | 5/2012 | Wang | G08G 1/096741 |
| | | | 701/414 |
| 2014/0350970 A1* | 11/2014 | Schumann, Jr. | G06Q 40/08 |
| | | | 705/4 |
| 2015/0219464 A1* | 8/2015 | Beaurepaire | G01C 21/3438 |
| | | | 701/538 |
| 2015/0369621 A1* | 12/2015 | Abhyanker | G01C 21/3438 |
| | | | 701/461 |
| 2016/0171521 A1* | 6/2016 | Ramirez | G06Q 10/0635 |
| | | | 701/409 |
| 2016/0189305 A1* | 6/2016 | Bogovich | H04W 4/024 |
| | | | 705/4 |
| 2016/0195406 A1* | 7/2016 | Miles | G06Q 10/0639 |
| | | | 701/537 |
| 2017/0011562 A1* | 1/2017 | Hodges | G08G 1/096741 |
| 2017/0213308 A1* | 7/2017 | Wellborn | G01C 21/3453 |
| 2018/0059687 A1* | 3/2018 | Hayes | G01C 21/343 |
| 2018/0113456 A1* | 4/2018 | Iagnemma | G08G 1/0133 |
| 2018/0137487 A1* | 5/2018 | Wang | G06Q 20/0855 |

* cited by examiner

SAFE ROUTING FOR NAVIGATION SYSTEMS

RELATED APPLICATIONS

This application is a continuation of U.S. patent application Ser. No. 16/272,915, filed Feb. 11, 2019, which is a continuation of U.S. patent application Ser. No. 15/969,743 (now U.S. Pat. No. 10,209,085), filed May 2, 2018, which is a continuation of U.S. patent application Ser. No. 15/881,677 (now U.S. Pat. No. 10,036,644), filed Jan. 26, 2018, which is in turn a continuation of U.S. patent application Ser. No. 15/378,043 (now U.S. Pat. No. 9,927,252), filed on Dec. 14, 2016, all of which are hereby incorporated by reference.

FIELD OF ART

This disclosure generally relates to the field of electronic navigation systems, and more specifically, to navigation that factors in safety considerations when routing.

BACKGROUND

Conventional navigation systems identify routes based on criteria such as total trip time and/or distance. However, users of navigation system may have a number of criteria that are of interest to them, and not solely existing criteria such as trip time. For example, safety is a concern that is of particular importance to a number of users, such as those traveling with their families, those traveling at night, etc. Unfortunately, existing systems provide little or no ability for users to determine routes that maximize safety, or that at least take safety into account.

The figures depict various embodiments for purposes of illustration only. One skilled in the art will readily recognize from the following description that alternative embodiments of the structures and methods illustrated herein may be employed without departing from the examples described herein.

DETAILED DESCRIPTION

Example methods and systems disclosed herein can facilitate requester-provider matching and routing by a transportation services system that takes into account the safety of the driver and of the rider. For example, a server deployed within a transportation services system can receive a request for a ride from a user. The server can match the user with an available driver and recommend a pick up location, a navigation route, and/or a drop off location. Based on a number of factors—such as, but not limited to, time of day, the amount of traffic, the weather, the driver's skill, and other like factors relevant to the safety of the rider and driver—the pick-up location, route, and/or drop-off location can be determined to meet some safety criteria. To this end, the server can track historical trip data and access a number of databases to determine the optimal trip that takes into account safety. Methods and systems are described below in greater detail.

Example methods and systems described below can utilize data relevant to safety to improve the safety of the trip without negatively affecting service for any particular area. A user requesting a ride from location A to location B will receive the requested service, and the system will analyze safety considerations in a way that may affect, if at all, the recommended pick-up location, the recommended drop-off location, or the recommended route from location A to location B. Thus, in an example aspect, service neutrality can be maintained across the area of service.

Figure 1:
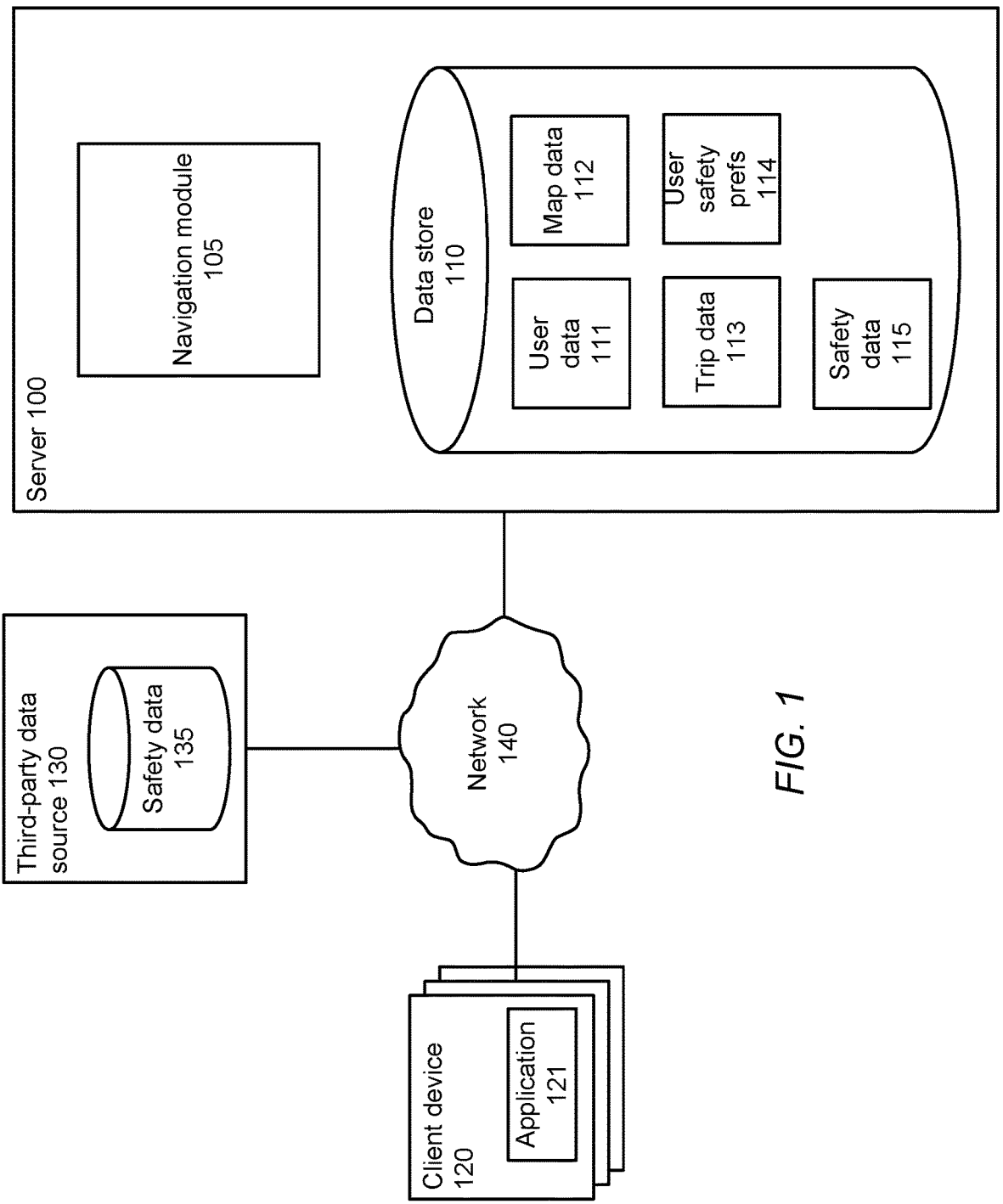
FIG. 1 illustrates a view of an environment in which users use their client devices to interact with a server, such as to arrange transportation services, according to one embodiment.

FIG. 1 illustrates a detailed view of an environment in which users use their client devices 120 to communicate with a server(s) 100, such as to request transportation services, according to one embodiment. For example, the server 100 can provide a network service to enable users to request location-based services using their respective designated client applications, such as to obtain transportation to a particular destination. The server 100 can process the requests to identify service providers to provide the requested services for the users.

The client device 120 can correspond to a computing device, such as a smart phone, tablet computer, laptop, or any other device that can communicate over the network 140 with the server(s) 100. In the embodiment illustrated in FIG. 1, the client devices 120 include an application 121 that the users of the client devices use to interact with the server 100, e.g., to provide location data and queries to the server 100, to receive map-related data and/or directions from the server, and the like. In one embodiment, the application 121 is created and made available by the same organization responsible for the server 100. Alternatively, in another example, the application 121 can be a third-party application that includes features (e.g., an application programming interface or software development kit) that enables communications with the server 100.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The server 100 comprises a navigation module 105 and a data store 110. The navigation module 105 facilitates the transportation of one user (hereinafter referred to as the rider)—or of objects, such as groceries, packages, or the like—by a second user (hereinafter referred to as the driver) from a first location (hereinafter referred to as the pickup location) to a second location (hereinafter referred to as the destination location, or simply the destination), such as by providing map and/or navigation instructions to the respective client application of the driver. In one example, the server 100 can include a matching service (not illustrated in FIG. 1 for purposes of simplicity) that facilitates a rider requesting a trip from a pickup location to a destination location, and further facilitates a driver agreeing to provide the trip to the rider. For example, the matching service interacts with the applications 121 of the rider and a selected driver, establishes a trip for the rider to be transported from the pickup location and the destination location, and handles payment to be made by the rider to the driver. Additionally, in one embodiment, the navigation module 105 interacts with at least the application 121 of the driver during the trip, obtaining trip location information from the application (e.g., via Global Positioning System (GPS) or other geolocation coordinates) and providing navigation directions to the application that aid the driver in traveling from the driver's current location to the specified destination of the trip. The navigation module 105 may also facilitate a driver navigating to or obtaining information about a particular location, regardless of whether the driver has a rider, such as permitting the driver to navigate to a particular gas station, to an area of high demand for drivers, or to the pickup location of a rider.

In some embodiments, the navigation module 105 assists a driver in navigating to an effective waiting location. The waiting location is a location for a driver that the navigation module 105 determines will improve the likelihood that the driver will be matched with a rider request in future. For example, the waiting location might be a location that minimizes the average distance to a set of expected (e.g., prior) pickup requests. The navigation module 105 may take safety into consideration when identifying a waiting location, e.g., to improve driver safety by recommending a waiting location that is known to be safe as well as nearby to expected pickup requests, and/or by using a route to the waiting location that traverses road segments that are known to be safe.

The data store 110 comprises various types of data that the navigation module 105 uses to provide navigation services and otherwise facilitate transportation. More specifically, the data store 110 includes user data 111, which includes information on all the registered users of the system, such as drivers and riders. The information may include, for example, user name, password full name, home address, billing information, prior trips taken by the user, and the like.

The data store further includes map data 112. The map data 112 include the information used to calculate routes, to render graphical maps, and the like. For example, the map data 112 include elements such as intersections and the roads connecting them, bridges, off-ramps, buildings, and the like, along with their associated locations (e.g., as geo-coordinates). In some embodiments the map data 112 also includes data about the "road segments"—the portions of the roads that connect the various pairs of map points such as intersections. The road segments may have associated data, such as road segment distance, the typical time to traverse a road segment from the point on one side of the segment to the point on the other, and the like. In some embodiments, this data is augmented to include a safety rating of the segment for each of a set of times of day, as described in more detail below with respect to the road segment safety calculator 320.

The data store further includes trip data 113. In some embodiments the trip data include data on the drivers of the trips, such as a rating, report, or comments given to or about the driver by the rider, and data related to the trip times and locations, such as the starting time, ending time, starting location, ending location, cost, duration, total distance, and/or a list of locations (e.g., road segment IDs) that the trip passed through and the times at which they were reached.

Furthermore, trip data 113 can include the number of passengers in the vehicle, which can be indicative of safety. For example, in some situations, more passengers can indicate increased safety (e.g., "safety in numbers"). In other situations, more passengers can indicate decreased safety (e.g., carpooling intoxicated strangers).

Further yet, vehicle make, model, year, and health can indicate safety. Certain vehicles are safer than others because some vehicles are more reliable, have better performance, are more structurally secure, have advanced safety features, and/or are less likely targets of theft.

The users (e.g., riders and/or drivers) of the server may specify user safety preferences 114 for navigation, such as the extent to which the user prefers to prioritize safety with respect to other factors. In one embodiment, the user specifies a weighting to apply to each factor (e.g., safety, total time, total distance, total cost) to indicate their relative importances to that user. The weightings may be specified directly or indirectly, such as directly by typing in numerical weight values into a user interface, directly by adjusting user interface elements such as sliders that correspond to the weights, or indirectly by choosing a single pre-set option that the server 100 maps to a corresponding set of weights to use (e.g., for a "family trip" option, a high weighting on safety and low weighting on total distance, or for a "commuter" option, a high weighting on total time, a moderate weighting on total distance, and a low weighting on safety). Weightings may also be specified for greater degrees of granularity, such as for different sub-types of safety considerations (e.g., weather hazards, crime, or interpersonal conflicts with drivers).

The data store further includes safety data 115. The safety data 115 is relevant to the safety of driving on a route, either directly or indirectly providing information about the safety of various road segments at various times. For example, the safety data 115 could include, but are not limited to:

(A) Trip drop-off and pick-up times and locations and volume of those trips. Knowledge of the volume of trips at given locations may help to predict degrees of safety, since greater volumes could lead to more accidents.

(B) Telematics data quantifying activity of the vehicle used on the trip, such as speed, amount of swerving, and amount of braking for individual trips and the individual drivers of those trips. This telematics data, e.g., aggregated over a number of users, can be used to identify dangerous road segments and/or how safe a particular driver is.

(C) Safety incident data, such as locations, times, drivers, and riders related to accidents, interpersonal conflicts (e.g., as expressed by complaints about drivers), or third party violence (e.g., at particular locations and times, or related to particular companies or other organizations). This data can likewise be used to identify dangerous road segments, and/or how safe a particular driver is.

(D) Location names and location types of establishments (such as restaurants, bars, or hotels). For example, particular location types may be known or believed to be more or less safe than others, and hence mapped by the server 100 to different safety scores for the road segments in (or near) which they are located. (E.g., police stations might be known to be relatively safe, and bars to be relatively unsafe.)

The environment of FIG. 1 also includes one or more third-party data sources 130. The third-party data sources 130 have safety data 135, which either directly or indirectly provide information about the safety of various road segments at various times. For example, the third-party safety data 135 could include, but are not limited to:

(A) Academic databases, such as those possessed by universities, e.g., updating in near-real time the reports of violent conflicts at particular locations and times.

(B) Event websites, listing the schedules (e.g., times and locations) of particular events and event types. (Particular types of events may be known or believed to be more or less safe, and/or to lead to a large volume of nearby people/traffic.)

(C) Sports websites, which can be analyzed to determine when and where sporting events will be taking place, for example.

(D) City or other governmental databases or websites, such as those providing domestic crime data.

(E) News media databases, such as those offering machine coding of events and stories (e.g., incidents of violent crime, or negative or positive news stories about a particular company or location).

(F) Satellite imagery, which can be used to detect storms, fires, the effects of earthquakes, numbers of vehicles in a particular area, and the like.

(G) Weather data (e.g., storms, rain, floods, etc.).

(H) Social media data, which can be analyzed to identify (for example) sentiment about events, companies, and the like.

(I) Transportation information, such as traffic data.

It is appreciated that the various types of data of FIG. 1 may be stored in any manner. For example, though the various data 111-115 are illustrated as being distinct, they might be included within the same database, file, or other storage unit. Furthermore, although the data 111-115 are described above as including particular types of data, it will however be appreciated that each of the types of data can be included in any one or more of the data 111-115 in alternative embodiments. As just one example, the safety data 115 could be stored as part of the trip data 113 (e.g., information about speed of various trips) or the user data 111 (e.g., the speed at which the driver drove on various trips).

Although for simplicity only one server 100, one third-party data source 130, and several client devices 120 are illustrated in the environment FIG. 1, it is appreciated that there may be any number of both client devices 120 and servers 100 within the environment.

Figure 6:
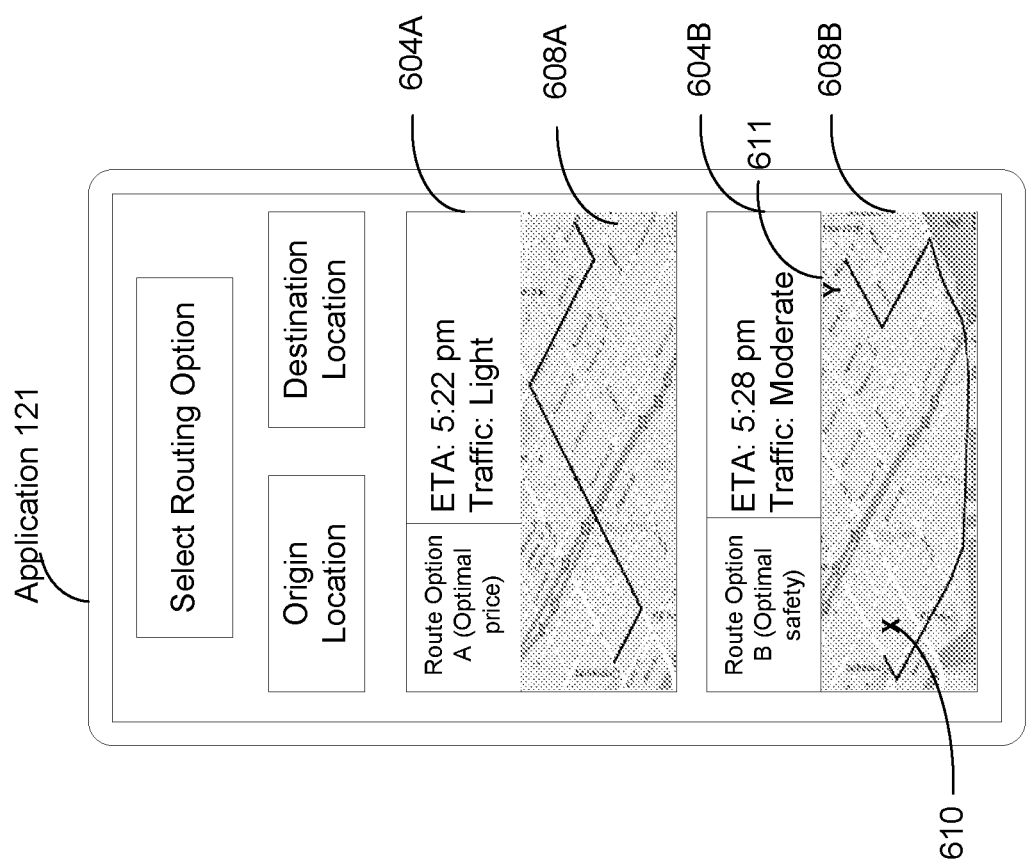
FIG. 6 illustrates a user interface of an application on the client device of a rider, according to one embodiment.

FIG. 6 illustrates a user interface of the application 121 on the client device 120 of a rider, according to one embodiment. The user interface presents the rider with multiple route options optimizing the route according to different criteria. Two such criteria—price and safety—are illustrated in FIG. 6 for purposes of simplicity, but it is appreciated that any number of such options could be provided. Specifically, the data areas 604 indicate the criteria for which the route was optimized (namely, price and safety, in the example of FIG. 6), the estimated arrival time (ETA), and the degree of traffic along the determined route. The map regions 608 visually depict the determined route on a map. Additionally, the map region 608B illustrates a safe waiting location 610 (visually indicated by an 'X') that the navigation module 105 determined is safer for the rider and/or driver to wait for pickup than the rider's specified origin location, and a safe dropoff location 611 (visually indicated by a 'Y') that the navigation module 105 determined is safer for the rider and/or driver to be dropped off than the rider's specified destination location. In some embodiments (not visually illustrated in FIG. 6), at least the map region 608B for the safety-optimized route visually illustrates portions of the map that considered safe (e.g., with a particular color or pattern) to aid the users in remaining within safe areas.

In one embodiment, the application 121 of a driver provides a visual indication of one or more locations on the map that the navigation module 105 determined to be effective waiting locations for the driver so as to maximize the likelihood of being matched with a rider trip request, while simultaneously taking driver safety into account. For example, even while the driver is not currently assigned to a ride, the application 121 might recommend the driver to navigate to a location that is both safe and close to predicted origin locations of expected future ride requests.

Figure 2:
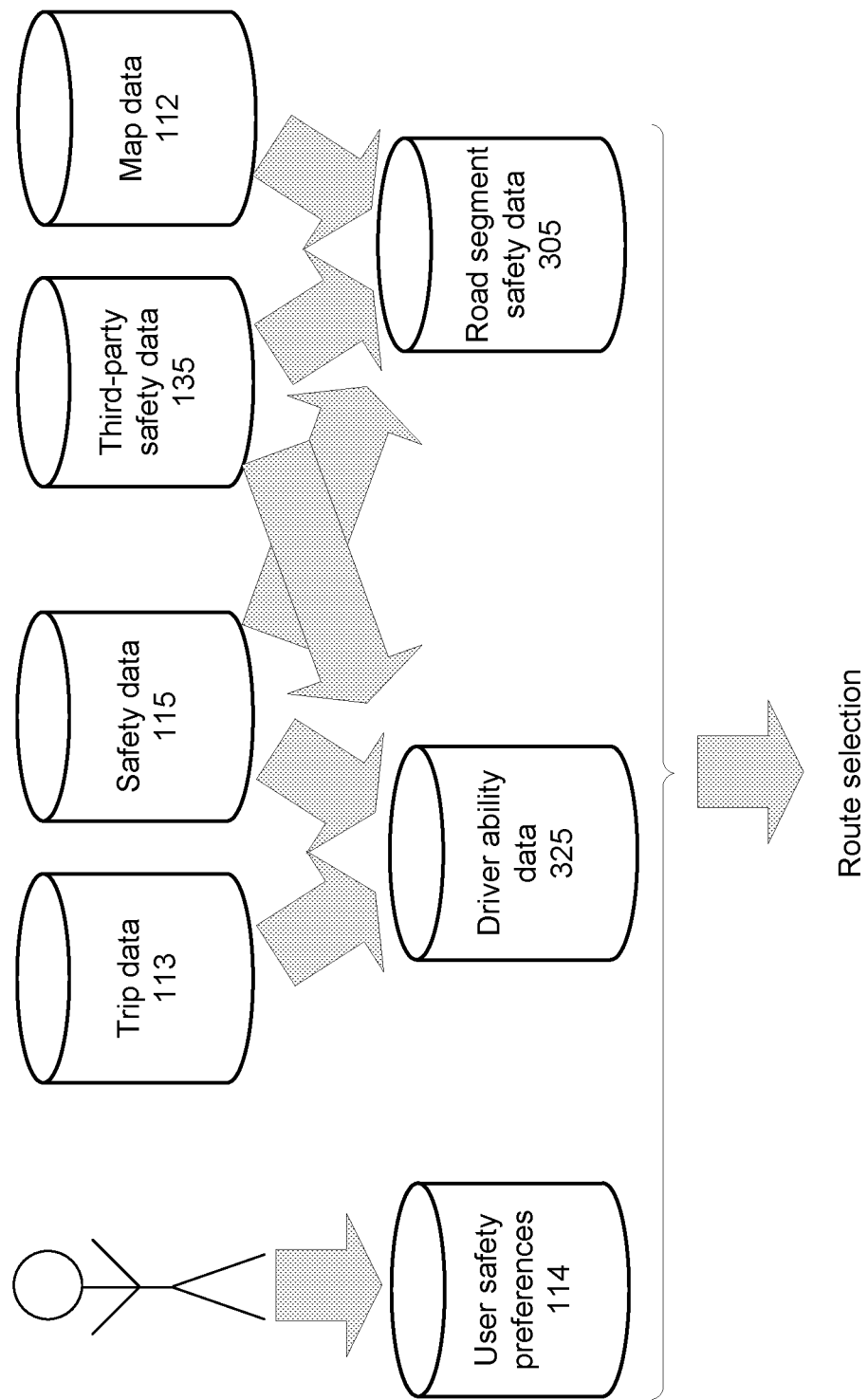
FIG. 2 is a data flow diagram illustrating the origin and derivation of the data sources used by the navigation module of FIG. 1 when calculating routes that take safety into account, according to one embodiment.

FIG. 2 is a data flow diagram illustrating the origin and derivation of the data sources used by the navigation module 105 when calculating routes that take safety into account, according to one embodiment.

Users of the navigation service provided by the server 100 specify their various user safety preferences 114, as noted above with respect to FIG. 1.

The trip data 113, the safety data 115, and/or third-party safety data 135, are processed to derive driver ability data 325, which characterize, for a given driver, how safe it will be to travel with the driver (e.g., based on the skill of the driver or the reliability or capability of the vehicle).

The map data 112 and safety data 115 of the server 100, and the safety data 135 of the third-party data sources 130, are processed together to derive road segment safety data 305. The road segment safety data 305 actually or conceptually supplements the map data 112, expressing information about the safety of the various segments of the road at different times of day.

When a given user requests a trip to a particular destination, in different embodiments the driver ability data 325 of the potential drivers, and the user's specified safety preferences 114 (if any), as well as the road segment safety data 305 itself, are taken into account when determining (e.g., computing or selecting) a route and, in example embodiments, a driver for the rider.

Additionally or alternatively, the server 100 can use the data to generate warnings that are provided to the users to indicate unsafe situations.

Figure 3:
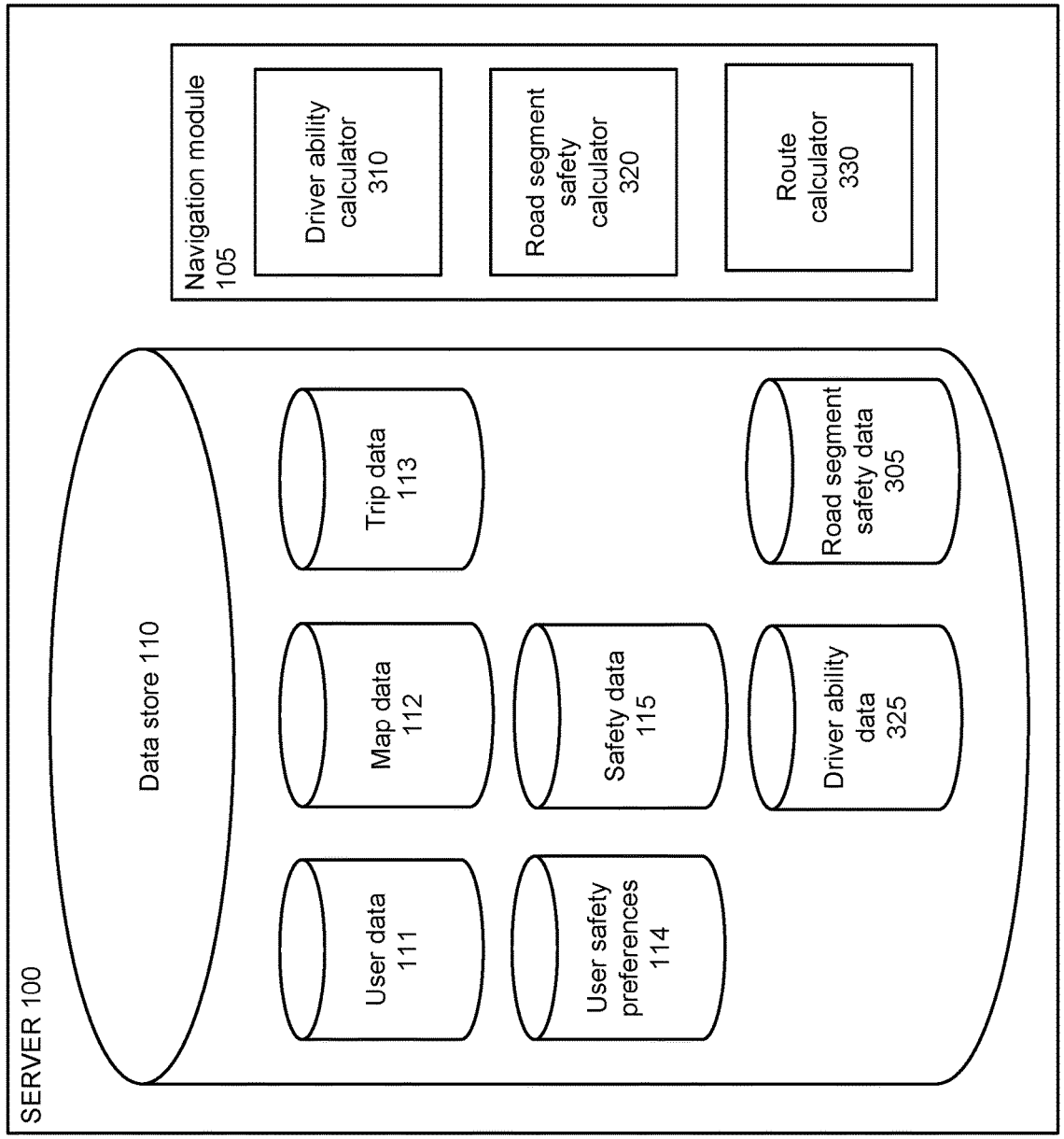
FIG. 3 is a block diagram illustrating a detailed view of the server of FIG. 1, according to one embodiment.

Additional details are now provided with respect to FIG. 3.

FIG. 3 is a block diagram illustrating a detailed view of the server 100 of FIG. 1, according to one embodiment.

The server 100 stores map data 112, trip data 113, user safety preferences 114, and safety data 115, as described above with respect to FIG. 1. The navigation module 105 further comprises a driver ability calculator 310, a road segment safety calculator 320, and a route calculator 330.

The driver ability calculator 310 processes the trip data 113 and the safety data 115 to generate the driver ability data 325. The driver ability data 325 quantifies the driver's ability to drive safely so as to minimize different types of risks. In some embodiments, a single ability score is computed for each driver; in other embodiments, a set of driver ability sub-scores is calculated for each driver (e.g., weather type scores indicating the driver's skill in different types of weather, such as rain, wind, and the like; or interpersonal conflict scores, indicating the driver's propensity to have disputes or other conflicts with riders), instead of or in addition to a single overall ability score. As some examples of the computation of the driver ability data score (and/or sub-scores) in various embodiments, the driver ability calculator 310 analyzes driver interpersonal conflicts based on reported interpersonal conflicts in the safety incident data of the safety data 115, or driver skill in different types of weather based on accidents listed within the safety incident data and known weather from the third-party safety data 135.

The server 100 also comprises a road segment safety calculator 320 that generates road segment safety data 305 based on the map data 112 and the safety data 135, 115.

The road segment safety calculator 320 extracts and processes safety-related data from the various safety data 135, 115, associating the safety-related data with particular road segments and/or times, and deriving safety scores for those road segments/times based on the nature of the data. For example, road segment safety calculator 320 may extract locations and times of reported safety-related incidents and map those locations to particular road segments in the map data 112, and to corresponding time ranges.

Using the extracted safety-related data, the road segment safety calculator 320 computes a safety score for the various road segments in the map data 112, the collection of the scores forming the road segment safety data 305. Further, since the degree of safety of a road segment may be a function of time as well as of the segment's location, safety scores are computed for the various road segments at multiple different times. For example, in some embodiments a safety score is calculated for each road segment for each 30-minute interval (and thus there are 48 safety scores for each road segment, corresponding to the 48 30-minute time intervals in a day). In some embodiments, there are also separate scores for each day of the week (e.g., 48 scores for each of 7 days of the week), or separate scores for weekdays and for weekends. In such embodiments, the safety scores may be stored in a data structure in which the segment ID and time range are index inputs and a safety score is the output, such as the following excerpt from hypothetical road segment safety data 305:

| Segment-ID | Time range | Safety score |
|---|---|---|
| 1 | Midnight-12:30 AM | 8 |
| 1 | 12:30 AM-1:00 AM | 12 |
| ... | ... | ... |
| 2 | Midnight-12:30 AM | 4 |
| ... | ... | ... |

In some embodiments, the overall score for a particular <road segment, time range> pair is computed as a weighted sum of different types of safety considerations. For example, numerical data for a first type of safety consideration for a given road segment and time range could be computed and multiplied by a given weight (e.g., 0.5) to produce a sub-score, and the same could be done for the other types of safety considerations, and the sub-scores summed to produce an overall safety score. In some embodiments, the sub-scores for the various safety considerations are stored for each <road segment, time range> pair, in addition to the overall safety score being stored.

In one embodiment, the road segment safety data 305 is incorporated into the same data structure(s) already storing the map data 112. For example, assuming that the map data 112 already stores for each segment and time range the average time required to traverse the segment during that time range, the safety score for the segment at each of the time ranges could be added to the map data 112, producing data such as the following hypothetical excerpt:

| Segment-ID | Time range | Average traversal time (seconds) | Safety score |
|---|---|---|---|
| 1 | Midnight-12:30 AM | 30 | 8 |
| 1 | 12:30 AM-1:00 AM | 29 | 12 |
| ... | ... | ... | ... |
| 2 | Midnight-12:30 AM | 40 | 4 |
| ... | ... | ... | ... |

In one embodiment, the road segment safety calculator 320 validates the accuracy of the computed road segment safety data 305. In one such embodiment, the route calculator 330 (discussed in more detail below) calculates trip routes for some users requesting rides without using the safety data 305, and for some users by using the safety data 305; the server 100 obtains information about safety-related incidents occurring on the various routes; the server then later analyzes the information to assess the relative safety of the trips whose routes were calculated using the safety data 305 versus those whose routes were not calculated using the safety data.

As stated, the server 100 also comprises the route calculator 330 that calculates routes. For instance, the route calculator 330 can calculate routes to use from a particular pickup location to a particular destination location, using safety as a factor. More specifically, one or more possible sequences of road segments from the pickup location to the destination location are analyzed, with each road segment being assigned a score (partially or entirely based on the road segment's safety data 305), and the road segment scores of the road segments on each of the various analyzed routes are summed for each analyzed route, producing overall route score for each sequence of road segments.

In example embodiments, the route calculator 330 can, additionally or alternatively, determine pick-up and drop-off locations based on safety considerations. For instance, based on historical trip data, sensor data, and/or third party data, the route calculator 330 can determine recommended pick-up or drop-off areas that are safe for passengers and/or safe for drivers. Safe areas may be determined based on the number of incidents relevant to driver or rider safety (e.g., car-and-car or car-and-pedestrian accidents, crime incidents related to driver or rider safety such as car-jacking, car theft, or assault on individuals or an organization associated with the driver, etc.), the presence of lighting (e.g., during night-time drop offs), the level of road traffic, the presence of pull-off areas (e.g., an unloading area), the presence of pedestrians, and one or more of the like.

In an illustrative example, the methods and systems disclosed herein can be used to improve safety of a carpool mode. In a carpool mode, the system can determine recommended drop-off locations primarily based on the efficiency of the shared trip for multiple riders. In this case, a first rider may be dropped some distance from the rider's final destination and the first passenger then walks the remaining distance to the final destination so that the travel times of the first and second riders are optimized dependently. As disclosed herein, systems and methods can also take into account safety data to improve safety for the driver and the first and second riders. For example, the server 100 can select a drop-off point that is safe for drop off and/or allows a safe walking route for the first passenger from the drop off location and the first passenger's final destination. The safe walking route can be determined and provided to the first rider by the server 100. Safe walking routes can be determined in a manner similar to the way that driving routes are generated.

Pick-up or drop-off locations can be determined in a number of ways. For example, the route calculator 330 can access predetermined safe locations stored in a database indexed by an initial end point. In an example embodiment, predetermined safe locations can be stored within the map data 112, which can provide predetermined safe locations for a destination based at least on time of day, day of the week, month, or any other suitable unit of time.

Additionally or alternatively, the route calculator can determine safe pick up and drop off locations en route (e.g., in real time) based on sensed data, such are real-time traffic or weather data or sensed ambient light (e.g., to ensure drop off or pickups occur in well-lit or monitored areas).

In embodiments that factor in driver skill into the overall route safety, the safety score for a particular road segment along a particular route can be computed dynamically for each potential driver. For example, for embodiments in which the driver ability data 325 includes different sub-scores for each driver, such as the driver's ability at different times of day (e.g., night driving), or in certain environmental conditions (e.g., rain), that driver ability data can be combined with the data known about the particular road segments along the route to modify the pre-calculated (non-driver-specific) road segment safety data 305. For instance, if a particular potential driver is known to perform well for night driving, then road segments along a route which would be traversed at night could have their safety scores increased for that route with respect to that driver.

In some embodiments, the driver ability data 325 for a potential driver is not applied on a per-road segment basis, but rather applied to an overall route score. For example, if a first route received an overall score (or a safety score) of x, and the driver's ability score were y, then the route might be assigned a modified overall score (or modified safety score) of xy, or x+y, for example.

Additionally, some embodiments factor in real-time environmental conditions into the safety scores for the various road segments. For example, events—such as current weather conditions, or current large-scale events such as concerts or political visits—that are not able to be readily predicted based on past known data can be identified in real or near-real time based on the safety data 115, 135 and used to compute real-time road segment safety scores. For instance, the road segment scores of road segment safety data 305 can be modified for a particular segment with respect to a trip to take into account that there is a concert at or near that road segment at a time that the route is predicted to traverse that road segment, which is predicted to reduce the safety of driving in that road segment, as well as increasing the time that it will take to traverse that road segment. (The modification of the road segment scores of the road segment safety data 305 are said to be with respect to the trip in that they do not modify the road segment safety data 305 as it is stored, but rather use the safety data 305 as an input for computing real-time road segment safety data scores for the particular trip, given the specifics of the trip such as the start time of the trip, the rider, the potential drivers, the current environmental conditions, etc.)

When summing the road segment safety scores along the various possible routes, the route calculator 330 indexes into the data structure storing the road segment safety data based on the road segment and the time at which the trip is estimated to be traversing that road segment. Average traversal time data for the various segments can be used to determine a time at which a particular route will traverse at a particular segment, e.g., by adding, to the starting time of the trip, the sum of the traversal times of the road segments earlier in the route. For example, if a particular route from the pickup location to the destination location were estimated to begin at 6:52 PM and end at 7:36 PM, and the sum of the average traversal times for prior road segments on that route were 34 minutes, then the next road segment would be estimated to be traversed starting at 7:26 PM. Accordingly, in embodiments that track safety scores for 30-minute ranges, the safety for the road segment (without factoring in real-time data based on the driver or current environmental conditions) would be determined by indexing into the road segment safety data 305 for that road segment and for the time range from 7:00 to 7:30 PM.

In one embodiment, a weighted shortest path graph algorithm is employed to determine the optimal route, with the intersections between the road segments being the nodes of the graph, and the weights for the edges being the road segment scores for the road segments that correspond to the edges (e.g., the overall scores). In various embodiments, the algorithm is Dijkstra's algorithm or the A* algorithm.

The overall scores for the road segments on a route may be computed differently in different embodiments. For example, the overall scores may simply be the overall safety scores (e.g., the safety scores of the road segment safety data 305, as possibly modified based on the potential driver and/or the real-time environmental conditions). Alternatively, the overall scores may be a weighted sum of various scores, such as the overall safety score, the road segment distance, the road segment expected travel time, or the like.

In sum, in one embodiment the safety score for a particular road segment k at time interval t for driver i and rider j may be expressed as:

$$\text{safety}(\text{roadSegment}\_{ijkt}) = \beta_1 * \text{accidents} +$$

$$\beta_2 * \text{speeding} +$$

$$\beta_n * \text{realTimeData},$$

where accidents represents the historical accident rate on roadSegment k at time t, speeding represents the historical average speed on roadSegment k at time t, and realTimeData represents all other safety statistics in safety data 115 and 135 in FIG. 2 (which includes and is not limited to: phone handling, hard braking, and hard accelerations based on telematics data, weather conditions, and emergency situations). Although accidents and speeding are illustrated in the above equation, in general, any safety factor (such as accidents or speeding) could be included, e.g., as part of the weighted combination above. The $\beta_1, \beta_2, \ldots, \beta_n$ are weights that control the relative importance of each safety statistic in the calculation of the safety score. In some embodiments, the $\beta_n$ weights are determined by the preferences of rider j (as defined by the rider's user safety preferences 114) and driving abilities of driver i (as defined by the driver's driver ability data 325). E.g., if the road segment has a low safety score for one type of safety consideration, but the particular rider is primarily concerned about a second type of safety consideration, then the negative impact on the safety score is comparatively lower than it would be if the rider were more concerned about the first type of safety consideration. In other embodiments, the $\beta_n$ weights are estimated using statistical models and machine learning in order to predict the safety of roadSegment k at a time t in the future based on historical safety statistics for that road segment. In most embodiments, driver abilities, rider preferences, and realTimeData are not known until the time that a rider requests a ride, and so the scores stored in the road segment safety data 305 do not completely define safety(roadSegment), and therefore additional calculations are performed at route determination time to determine the safety score of road segments on that particular trip and route.

The overall score for a road segment may take into account factors in addition to safety, such as distance and/or travel time. In such embodiments, the overall score for a road segment may be expressed as:

$$\text{overall Score(roadSegment)} = \Sigma_t [\text{score}_t * \text{weight}_t]$$

where t represents a particular type of score (e.g., safety score, distance score, time score), $\text{score}_t$ represents the score for that type of score, and $\text{weight}_t$ represents the weight to be given to that type of score.

The overall score for a route is then computed as the sum of the overall scores of the road segments along the route:

$$\text{routeScore} = \Sigma_k \text{overallScore}(\text{roadSegment}\_k)$$

where k represents all roadSegment k's that the route traverses. The optimal safety route between given start and end locations is identified by solving the shortest path problem (lowest routeScore among all possible routes), where the overallScore(roadSegment_k) are weights on each edge in the road network (representing cost to traverse based on time, distance, speed limits, and safety risks, amongst other things, for driver i and rider j at time interval t). In one embodiment, the shortest path problem is solved using Dijkstra's Shortest Path Algorithm. Other common algorithms for identifying shortest paths include: A*, Bellman-Ford, Floyd-Warshall, Prim, and Jump Point Search.

In some embodiments, the route calculator 330 performs route calculation entirely in response to a user's request; in other embodiments, in order to speed up route calculation, portions of the routing computations are pre-computed, without respect to a particular user or to environmental factors.

In some embodiments, the route calculator 330 removes from consideration any road segments that have calculated safety scores below some threshold. This protects drivers and riders from traveling through road segments that pose a significant risk. In different embodiments the threshold may be for the road segment safety as a whole, or may be for particular safety sub-scores for the various different safety considerations, and may be either fixed values applying to all users, or may be rider-specific, based on the rider's user safety preferences 114. For example, the user's safety preferences 114 may specify some minimum required safety level for each of various safety considerations.

In some embodiments, the route calculator 330 removes from consideration any routes that achieve a performance that is a threshold amount worse (with respect to some specified non-safety metric) than the optimal route that does not take safety into account (e.g., referred to herein as the "baseline route"). For example, a route taking safety into account but taking more than, say, 20% more time or increasing the trip fare by 15% more than the baseline route not considering safety could be removed from consideration.

In some embodiments, the route calculator 330 is configured compare a candidate safe route with the baseline route. The comparison can be based on one or more performance metrics, such as time, distance, or cost. In an example embodiment, the route calculator 330 automatically (e.g., without user intervention) selects the candidate route where the performance difference is less than a threshold. Based on determination that the safe route has a performance difference above the threshold, the server 100 provides the user (e.g., just the driver, just the rider, or both the rider and the driver) a request to approve the safe route over the baseline route.

In example embodiments, the server 100 compares user safety preferences 114 of the rider and the driver prior to matching the rider and the driver. In one aspect, the server 100 identifies that a candidate driver and the rider have user safety preferences 114 that do or can cause a conflict (e.g., the rider prefers to keep the far the lowest and the driver requires the safest route). In such a case, the server 100 can determine another candidate driver to match to the rider.

Thresholds can be specified individually as part of the user safety preferences 114.

While FIG. 3 shows that server 100 includes particular components, it will be appreciated that one or more components of server 100 can be deployed, wholly or partially, in any suitable device of FIG. 1 in alternative embodiments.

Figure 4:
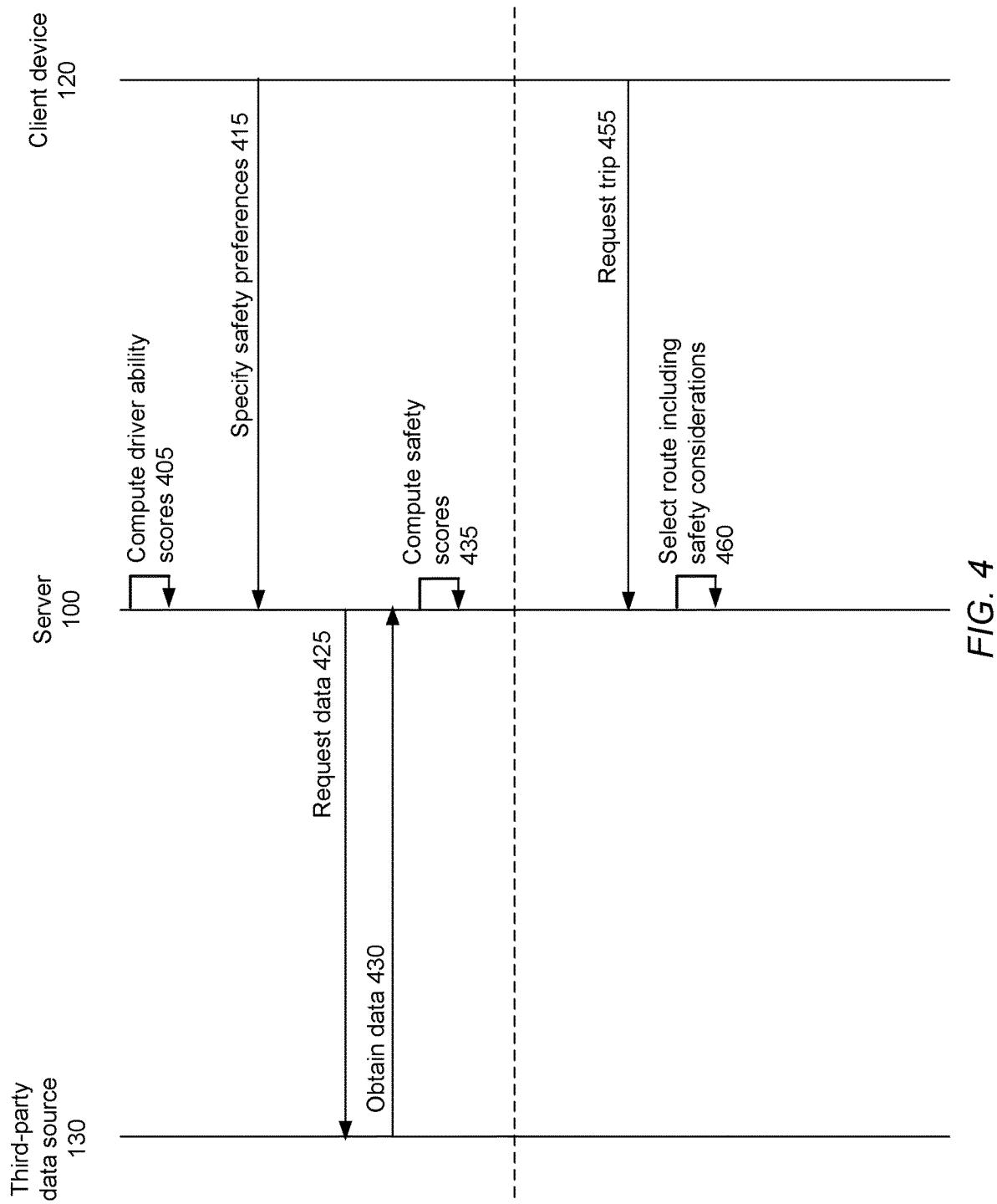
FIG. 4 is a sequence diagram illustrating the interactions taking place as part of the overall process of determining routes that take safety into account, according to one embodiment.

FIG. 4 is a sequence diagram illustrating the interactions taking place as part of the overall process of determining routes that take safety into account, according to one embodiment.

At one or more times, the server 100 computes 405 driver ability scores for the various drivers based on existing driver data, as discussed above with respect to the driver ability calculator 310.

The various users use their client devices 120 to specify 415 their personal safety preferences, which are reflected in the user safety preferences data 114.

The server 100 requests 425 and obtains 430 data from the various third-party data sources 130, and using that data computes 435 the road segment safety scores 305, as discussed above with respect to the road segment safety calculator 320.

A particular user then uses the user's client device 120 to request 455 a trip from a pickup location to a destination location. Accordingly, the server 100 determines 460 a route that takes safety into account, as discussed above with respect to the route calculator 330.

Figure 5:
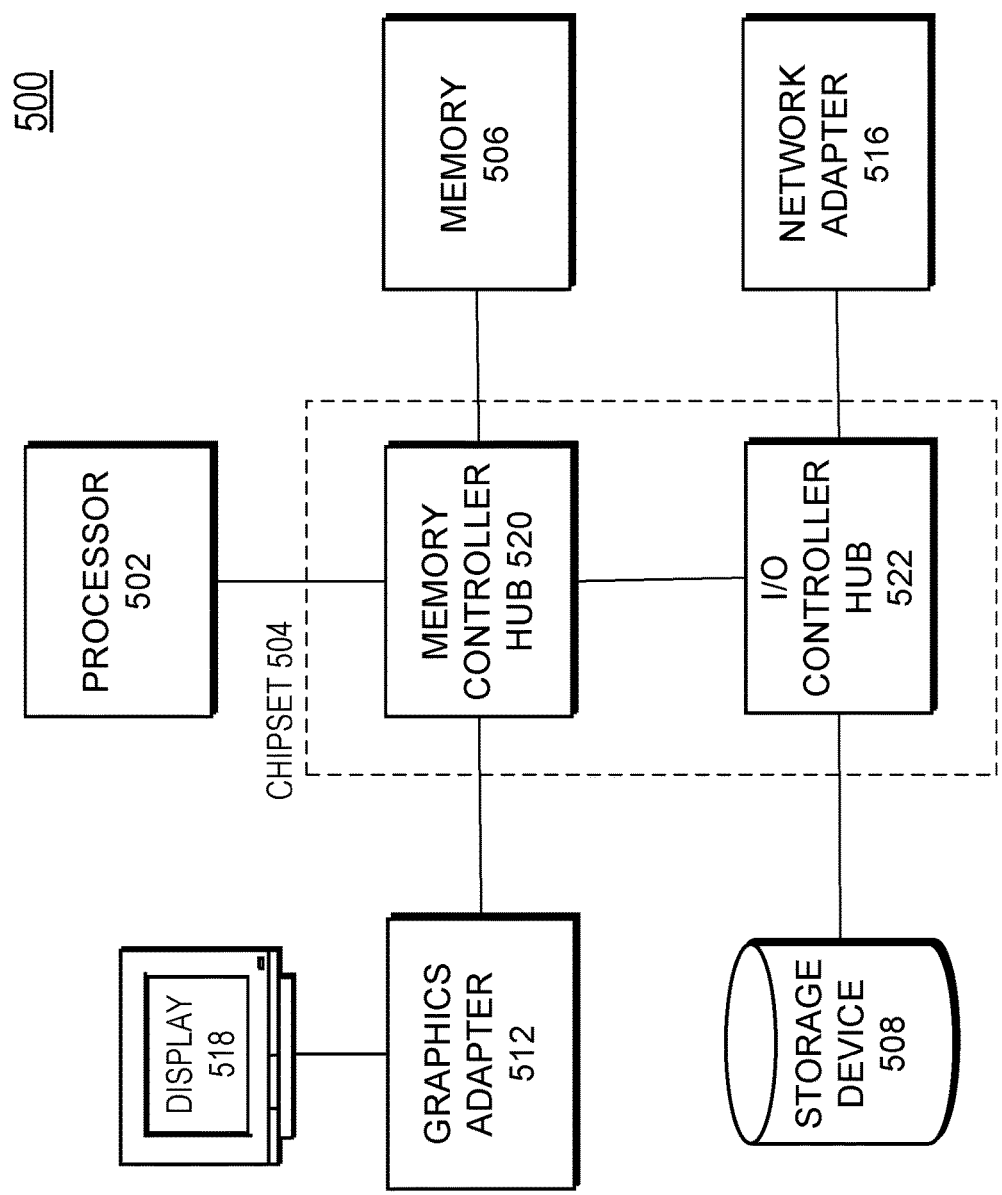
FIG. 5 is a high-level block diagram illustrating physical components of a computer used as part or all of the server or client devices from FIG. 1, according to one embodiment.

FIG. 5 is a high-level block diagram illustrating physical components of a computer 500 used as part or all of the server 100 or client devices 120 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 such as a server or smartphone may lack a graphics adapter 512, and/or display 518, as well as a keyboard or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by a server system, the computer-implemented method comprising:
   receiving, from an application on a client device, a request for a trip;
   accessing road segment safety data indicating safety-related data for one or more given road segments of a map database for one or more time periods, such that each of the one or more given road segments has associated stored safety-related data for each of the one or more time periods;
   determining at least one of the following, based at least in part on the road segment safety data:
   a safe pick-up location for the trip, or
   a safe drop-off location for the trip;
   determining a route for the trip using at least the road segment safety data and the at least one of the safe pick-up location or the safe drop-off location;
   receiving client device location information from the application; and
   providing, to the application using the determined route and the received client device location information, navigation directions according to the determined route.

2. The computer-implemented method of claim 1, further comprising determining at least one of the safe pick-up location or the safe drop-off location using real-time sensed data comprising at least one of real-time traffic data, real-time weather data, or sensed ambient light.

3. The computer-implemented method of claim 1, wherein determining a route for the trip comprises:
computing expected times at which the route will traverse road segments on the route;
identifying the safety-related data of at least some of the road segments on the route; and
determining overall safety scores for the road segments on the route using the identified safety-related data of at least some of the road segments on the route and using the computed expected times.

4. The computer-implemented method of claim 3, wherein determining the route for the trip using the road segment safety data comprises:
applying a weighted shortest path graph algorithm to the map database and to the determined overall safety scores to select the route.

5. The computer-implemented method of claim 3, further comprising, responsive to receiving the trip request:
identifying potential drivers to carry out the trip request; and
modifying the road segment safety data for the trip using driver ability data corresponding to the identified potential drivers.

6. The computer-implemented method of claim 5, further comprising computing a driver interpersonal conflict safety score based on rider reports of prior trips of a driver, wherein the driver ability data for a driver includes the driver interpersonal conflict safety score.

7. The computer-implemented method of claim 5, wherein the driver ability data for a driver includes a plurality of scores quantifying an ability of the driver to drive in a corresponding plurality of environmental conditions.

8. The computer-implemented method of claim 7, wherein modifying the road segment safety data comprises:
identifying current environmental conditions for road segments in the map database; and
modifying the road segment safety data for the road segments using the identified current environmental conditions and the plurality of scores quantifying the driver's ability to drive in a corresponding plurality of environmental conditions.

9. The computer-implemented method of claim 3, further comprising, responsive to receiving the trip request:
identifying user safety preferences of a rider requesting the trip; and
modifying the road segment safety data for the route using the user safety preferences.

10. The computer-implemented method of claim 9, wherein the user safety preferences include weightings corresponding to a plurality of different types of safety risks, and wherein the road segment safety data include weightings corresponding to the plurality of different types of safety risks and indicating degrees of those types of safety risks on the road segments of the map database.

11. The computer-implemented method of claim 10, further comprising:
receiving, from a rider requesting the trip, a single pre-set option; and
mapping the single pre-set option to the weightings corresponding to the plurality of different types of safety risks.

12. The computer-implemented method of claim 3, further comprising:
determined a second route for the trip without using the road segment safety data; and
determining that the route determined using the road segment safety data is more than a threshold degree worse than the second route with respect to a given non-safety metric; and
refraining from using the determined route responsive to determining that the route is more than the threshold degree worse.

13. The computer-implemented method of claim 3, further comprising:
for a plurality of additional requested trips, determining routes for a first plurality of the trips using the road segment safety data and routes for a second plurality of the trips without using the road segment safety data; and
receiving information about occurrences of safety-related incidents on the trips;
assessing accuracy of the road segment safety data by comparing the occurrences of safety-related incidents on the first plurality of trips to the occurrences of safety-related incidents on the second plurality of trips.

14. The computer-implemented method of claim 3, wherein the road segment safety data are computed using telematics data quantifying activity of vehicles used on trips.

15. The computer-implemented method of claim 3, wherein the road segment safety data are computed using real-time weather data.

16. The computer-implemented method of claim 3, wherein the road segment safety data are computed using safety incident data.

17. The computer-implemented method of claim 3, wherein the road segment safety data are computed using establishment types of establishments located at particular locations, the method further comprising determining safety scores for road segments based on road segments in which the establishments are located and the establishment types.

18. The computer-implemented method of claim 3, wherein the road segment safety data are computed using traffic volume data.

19. A non-transitory computer-readable storage medium storing instructions that when executed by a computer processor perform actions comprising:
receiving, from an application on a client device, a request for a trip;
accessing road segment safety data indicating safety-related data for one or more given road segments of a map database for one or more time periods, such that each of the one or more given road segments has associated stored safety-related data for each of the one or more time periods; and
determining at least one of the following, based at least in part on the road segment safety data:
a safe pick-up location for the trip, or
a safe drop-off location for the trip;
determining a route for the trip using at least the road segment safety data and the at least one of the safe pick-up location or the safe drop-off location;
receiving client device location information from the application; and
providing, to the application using the determined route and the received client device location information, navigation directions according to the determined route.

20. A computer system comprising:
a computer processor; and a non-transitory computer-readable storage medium storing instructions that when executed by the computer processor perform actions comprising:
  receiving, from an application on a client device, a request for a trip;
  accessing road segment safety data indicating safety-related data for one or more given road segments of a map database for one or more time periods, such that each of the one or more given road segments has associated stored safety-related data for each of the one or more time periods; and
  determining at least one of the following, based at least in part on the road segment safety data:
    a safe pick-up location for the trip, or
    a safe drop-off location for the trip;
  determining a route for the trip using at least the road segment safety data and the at least one of the safe pick-up location or the safe drop-off location;
  receiving client device location information from the application; and
  providing, to the application using the determined route and the received client device location information, navigation directions according to the determined route.

* * * * *